(12) United States Patent
Wray

(10) Patent No.: US 7,885,648 B2
(45) Date of Patent: Feb. 8, 2011

(54) METHOD AND SYSTEM OF REPORTING CONFORMANCE VIOLATIONS IN WEB-SERVICES MESSAGES

(75) Inventor: John C. Wray, Chelmsford, MA (US)

(73) Assignee: International Business Machines Corporation, Armonk, NY (US)

(*) Notice: Subject to any disclaimer, the term of this patent is extended or adjusted under 35 U.S.C. 154(b) by 389 days.

(21) Appl. No.: 12/171,039

(22) Filed: Jul. 10, 2008

(65) Prior Publication Data
US 2010/0011082 A1 Jan. 14, 2010

(51) Int. Cl.
*H04M 3/00* (2006.01)
(52) U.S. Cl. ............... 455/418; 455/2.01; 455/423; 709/229; 717/106
(58) Field of Classification Search .......... 455/2.01, 455/418, 423; 709/229; 719/106
See application file for complete search history.

(56) References Cited
U.S. PATENT DOCUMENTS 7,634,555 B1 * 12/2009 Wainscott et al. ........... 709/223
2007/0293210 A1 * 12/2007 Strub et al. ................. 455/420
2008/0108370 A1 * 5/2008 Aninye ..................... 455/456.1
2008/0178169 A1 * 7/2008 Grossner et al. ............ 717/170
2008/0250157 A1 * 10/2008 Ohata ......................... 709/236
2009/0282385 A1 * 11/2009 Boland et al. ............... 717/106

* cited by examiner

*Primary Examiner*—Nhan Le

(57) ABSTRACT

Methods, systems, and computer readable media for reporting conformance violations in web-services messages are described. A web message is received, and a location tag is assigned to at least a portion of the elements contained therein. The web message is analyzed to determine if any conformance violations are contained therein. When the web message contains at least one conformance violation, a descriptive entry is generated in a partial nonconformance report for each conformance violation, wherein the descriptive entry includes the location tag assigned to the element containing the conformance violation. The web message is annotated with the location tag for each conformance violation and merging the annotated web message with the partial nonconformance report to thereby produce a full nonconformance report, and an analyzed web message is output.

25 Claims, 5 Drawing Sheets

```
400     <?xml version="1.0" encoding="UTF-8"?>
402     <dpcr:ConformanceReport
          xmlns:dpcr="http://www.datapower.com/ConformanceAnalysis>
            <dpcr:Report requirement="R3103" severity="WARN"
            specification="BSP1.0" type="Conformance">
              <dpcr:Location name="URI" node-id="node21" parent="ds:Reference"
            type="Attribute"></dpcr:Location>
              <dpcr:Details>A dsig:Signature element is not a Detached
            Signature</dpcr:Details>
            </dpcr:Report>
            <dpcr:Report requirement="R3104" severity="WARN"
            specification="BSP1.0" type="Conformance">
              <dpcr:Location name="URI" node-id="node21" parent="ds:Reference"
            type="Attribute"></dpcr:Location>
              <dpcr:Details>A dsig:Signature element is an Enveloped
            Signature</dpcr:Details>
            </dpcr:Report>
            <dpcr:Report requirement="R3001" severity="WARN"
            specification="BSP1.0" type="Conformance">
              <dpcr:Location name="ds:Reference" node-id="node21"
            type="Element"></dpcr:Location>
              <dpcr:Details>A SIGNATURE_REFERENCE should use a shorthand
            XPointer</dpcr:Details>
            </dpcr:Report>
404         <dpcr:Report requirement="R3002" severity="FAIL"
            specification="BSP1.0" type="Conformance">
406           <dpcr:Location name="ds:Reference" node-id="node21"
            type="Element"></dpcr:Location>
              <dpcr:Details>A SIGNATURE_REFERENCE to an element that does not
            have an ID attribute (and which cannot therefore use a shorthand XPointer
            or be referenced by a shorthand XPointer) MUST contain a TRANSFORM with
410         an Algorithm attribute value of
            "http://www.w3.org/2002/06/xmldsig-filter2"</dpcr:Details>
            </dpcr:Report>
          </dpcr:ConformanceReport>
```

METHOD AND SYSTEM OF REPORTING CONFORMANCE VIOLATIONS IN WEB-SERVICES MESSAGES

BACKGROUND OF THE INVENTION

"Web standards" can be standardized markup languages used to facilitate the sharing of structured data across different computer information systems, particularly via the Internet, and may also be used both to encode documents and to serialize data. Such standards generally employ the Extensible Markup Language ("XML") as a foundation for their syntax. Internet XML standards tend to be unrestrictive, preferring expressibility over interoperability. This has led to the development of various profiles of XML-based web standards, where a profile limits the permissible options in order to improve interoperability between independent implementations of the standard.

Compatibility problems can arise when independently implemented versions of a web standard interact with one another, even if both implementations have attempted to follow the same profile. It can be desirable for an organization to standardize its web services using a selected web profile, for example, to foster interoperation with web-based components developed by different vendors. However, compatibility problems, such as if the implemented web services are non-conformant to the selected web profile and/or if external communicating parties are operating non-conformant implementations, can hamper interoperability or even cause the organization's web-based services to cease functioning. Individual instances of this non-conformity, known as "conformance violations," can include the use of a construct in a message which, while permissible by a base web standard, is not permissible in the profile being followed, or the non-use of a construct required by the profile.

BRIEF SUMMARY OF THE INVENTION

Methods, systems, and computer readable media for reporting conformance violations in web-services messages are described. A web message is received, and a location tag is assigned to at least a portion of the elements contained therein. The web message is analyzed to determine if any conformance violations are contained therein. When the web message contains at least one conformance violation, a descriptive entry is generated in a partial nonconformance report for each conformance violation, wherein the descriptive entry includes the location tag assigned to the element containing the conformance violation. The web message is annotated with the location tag for each conformance violation and the annotated web message is merged with the partial nonconformance report to thereby produce a full nonconformance report, and an analyzed web message is output.

In an exemplary embodiment, the conformance violation is repaired if the conformance violation can be repaired.

BRIEF DESCRIPTION OF SEVERAL VIEWS OF THE DRAWINGS

FIG. 4 illustrates an exemplary embodiment of a partial nonconformance report.

DETAILED DESCRIPTION OF THE INVENTION

Processes, systems, and computer readable media for reporting protocol violations in web-services messages are described. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
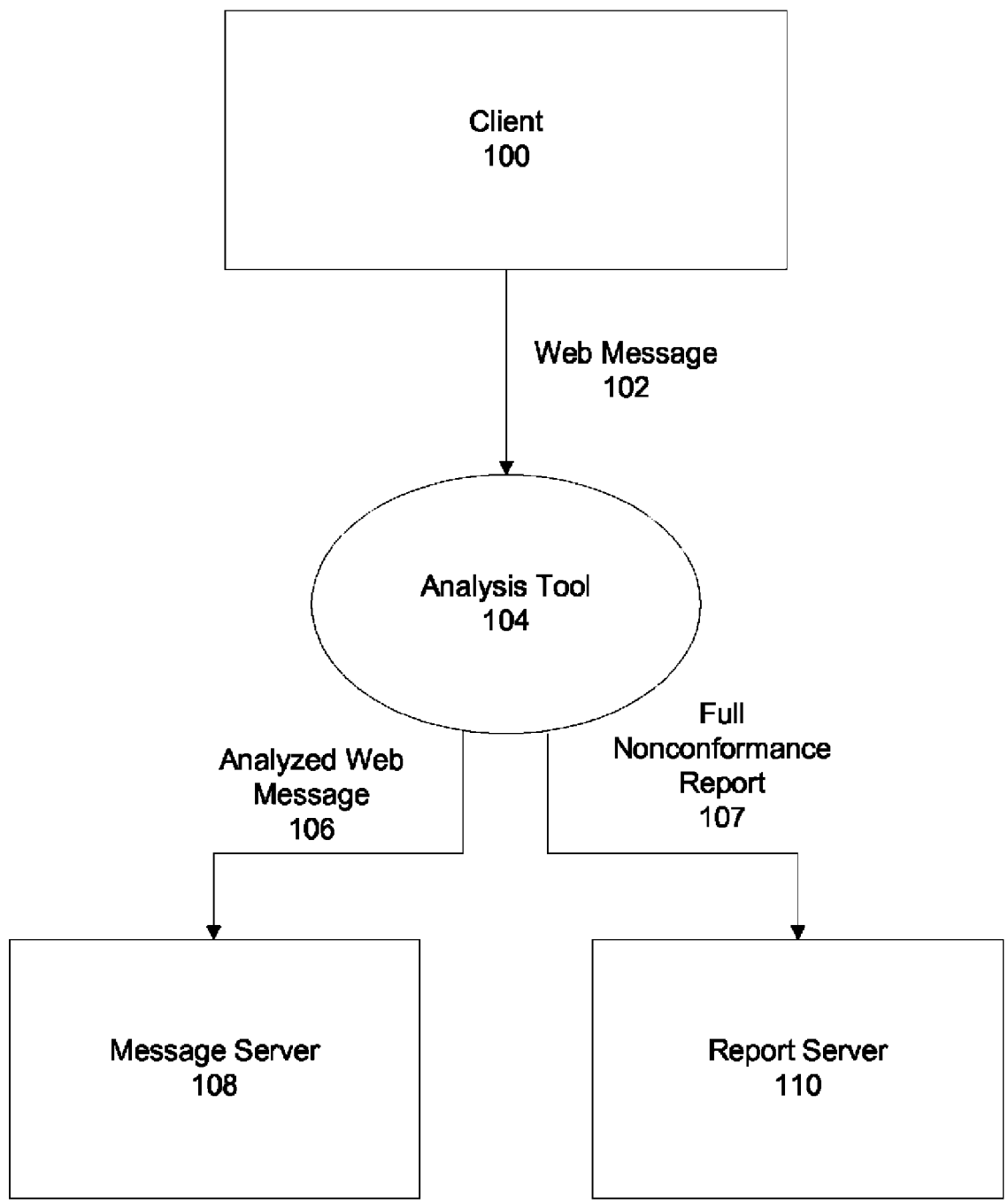
FIG. 1 illustrates an exemplary embodiment of a system for reporting conformance violations in web-services messages.

FIG. 1 illustrates an exemplary embodiment of a system for reporting conformance violations in web-services messages. The system includes a client 100, an analysis tool 104, a message server 108, and a report server 110. In an exemplary embodiment, the analysis tool 104 can be implemented as a function executed by a network appliance. In another embodiment, the analysis tool 104 can be implemented within the message server 108 (e.g., as a hardware component, or as software). While FIG. 1 illustrates the analysis tool as being between a client and a server, the analysis tool can be implemented between any two communicating entities. Furthermore, in an exemplary embodiment, a single server can perform the services performed by the message server 108 and the report server 110.

The analysis tool 104 can perform conformance analysis on web messages as they flow from a transmitter to a recipient. The client 100 can send a web message 102 to the server 108 that is intercepted by the analysis tool 104. The web message 102 can be any request for web services. In an exemplary embodiment, the web message 102 complies with an XML specification. Additionally, in an exemplary embodiment, the web message 102 can be compliant with the Simple Object Access Protocol ("SOAP").

When the conformance analysis (and, in some embodiments, repair of the web message 102) is complete, analysis tool 104 outputs a full conformance report 107 and an analyzed web message 106. The full conformance report 107 can include a partial conformance report, which can describe the nature and location of any conformance violations, and an annotated copy of the web message 102. The full conformance report can be sent to a report server 110, which can log full conformance reports for incoming messages and can be used to retrieve and review the full conformance report 107.

The analyzed web message 106 can be web message 102 after it has undergone analysis by analysis tool 104. The analyzed message can be substantially identical to web message 102, or in some embodiments can be modified, as described below. The analyzed web message is sent to a message server 108, where it can be processed such that message server 108 can cause a response to be sent to the client 100.

The analysis tool 104 described herein can advantageously analyze web-services messages as they flow between components, identify conformance violations in incoming web messages, and can also be used as a filter to reject messages that are severely non-conformant. Furthermore, the results of this analysis can be presented to a user in a nonconformance report that makes it relatively easy to determine the nature of the non-conformance. The analysis tool 104 can be further advantageous because the partial nonconformance report can be constructed incrementally, so that conformance analyzers for a variety of profiles may be assembled in sequence. Also, the partial nonconformance report can advantageously facilitate the automatic repair of specific conformance violations by providing the location tag for the conformance violation.

Figure 2:
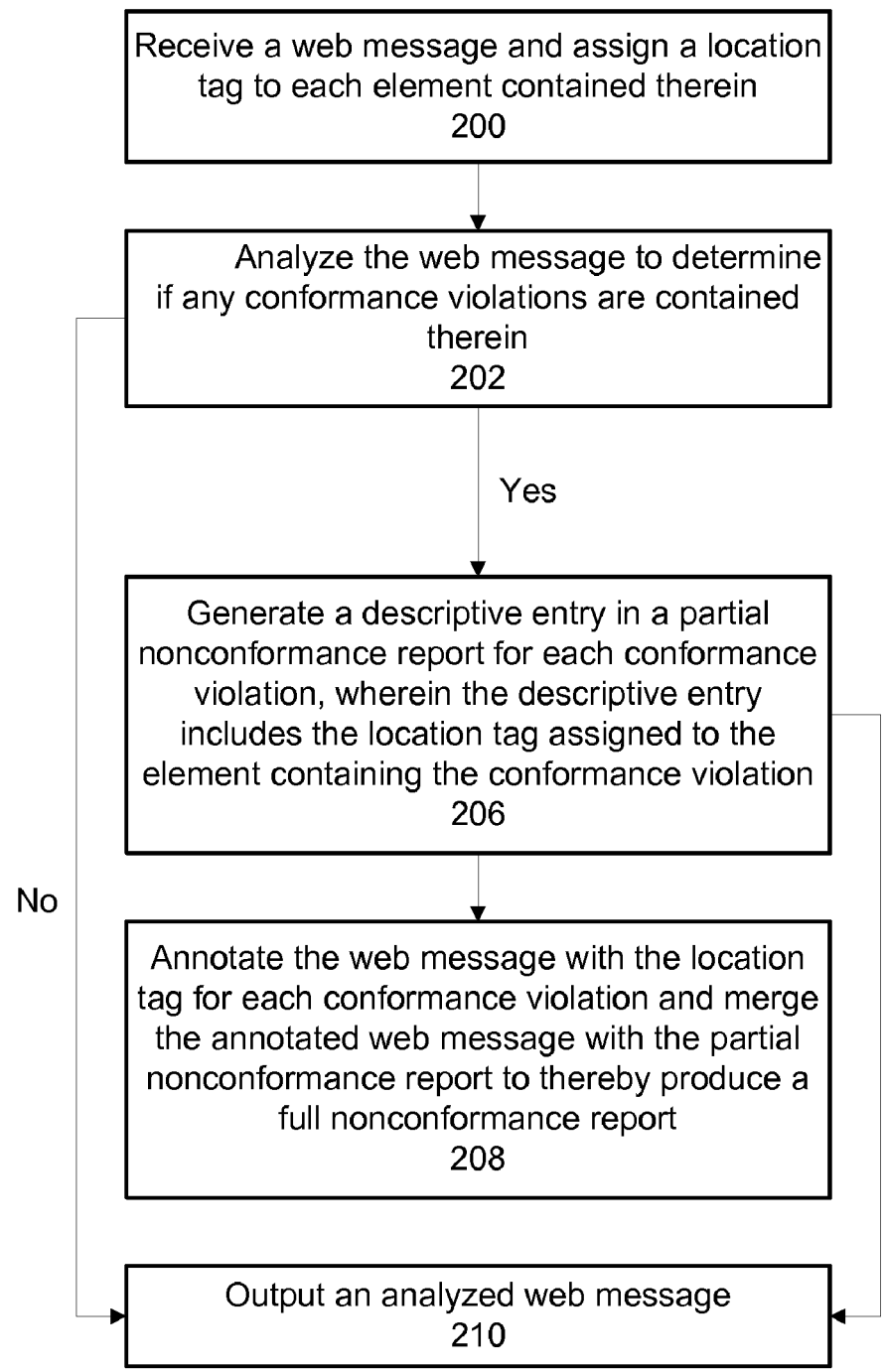
FIG. 2 illustrates an exemplary embodiment of a process for reporting conformance violations in web-services messages.

FIG. 2 illustrates an exemplary embodiment of a process for reporting conformance violations in web-services messages. The process can be performed by a network appliance, such as, for example, a DataPower appliance sold by International Business Machines Corporation ("IBM") headquartered in Armonk, N.Y.

The web message 102 is received, and at least a portion of the elements within the web message 502 are assigned a unique location tag (block 200). In one embodiment, each element in the web message 502 is assigned a location tag. The location tag permits entries in a partial nonconformance report, discussed below, to identify the location of the conformance violation within the web message 102. The analysis tool 104 can in an exemplary embodiment use a unique character string as the location tag. The web message 102 can then be analyzed to determine if any conformance violations are contained therein (block 202). If no conformance violations are found, then no changes are made to the web message 102, and the analyzed web message 106 is output (e.g., to a message server) (block 210).

If at least one conformance violation is found, then a descriptive entry is generated in a partial nonconformance report for each conformance violation, wherein the descriptive entry includes the location tag assigned to the element containing the conformance violation (block 206). The descriptive entry describes the conformance violation, and may include a textual description of the nature of the conformance violation. The location tag allows a conformance violation entry to refer to a specific element by, for example, an ID attribute value, or to a reference attribute by the parent element and the attribute name. The inclusion of the location tag can be advantageous for at least two reasons. First, it enables a user interface to be constructed from the report that, for example, uses the violation entries to create clickable links that highlight the location of the conformance violation within the web message 102. Such a user interface could be created as an HTML document by applying a simple transformation to the report (e.g., an XSLT program, or a program written in a language such as "C"). Second, including the location tag allows analysis stages that repair specific non-conformances, as discussed below, to locate the violation to be repaired within the web message 102, without having to repeat the conformance analysis when performing repairs.

While the analysis is performed, the partial nonconformance report can be maintained separately from the web message 102 (e.g., in a separate file, or in a distinct portion of XML code). The analysis can include multiple stages, wherein each stage can examine the web message 102 for a specific type of conformance violation or against a variety of different profiles (e.g., combinations of the various WS-I profiles). When the analysis includes multiple stages, each stage can examine the web message 102 and incrementally generate conformance violation entries in the nonconformance report. After the analysis is complete, an analyzed web message 106 can be output by the analysis tool. If no repairs are made to the web message 102 (see below for a discussion of repairing the web message 102), the analyzed web message 106 can be substantially identical to the web message 102.

The web message is annotated with the location tag for each conformance violation and merged with the partial nonconformance report (block 208), thereby producing a full nonconformance report 107 as described hereinabove. In an exemplary embodiment, the web message is annotated with the location tags after the descriptive entries are generated for each located conformance violation. In another embodiment, the web message 102 can be annotated with the location tags before the web message 102 is analyzed in block 202. Also, block 210 is executed and the analyzed web message 106 is output.

In an exemplary embodiment, if the analysis detects a sufficiently severe degree of non-conformance (e.g., there are too many conformance violations, or the conformance violations are too severe for the message server 108 to process), then the analysis tool 104 can reject the web message 102. In an exemplary embodiment, the web message 102 can be rejected after it is detected in the analysis. Such embodiments can be advantageous because this avoids further analysis of a web message that will be ultimately rejected, thereby allowing the analysis tool 104 to devote processing resources to other web messages. However, in another embodiment, the web message 102 can be rejected at a later point in time, such as after all analysis stages have been executed, or after repairs have been made to the web message 102. These embodiments can be advantageous because they can allow analysis of web message 102 to be performed against all profiles, which can be documented in a full nonconformance report.

Figure 3:
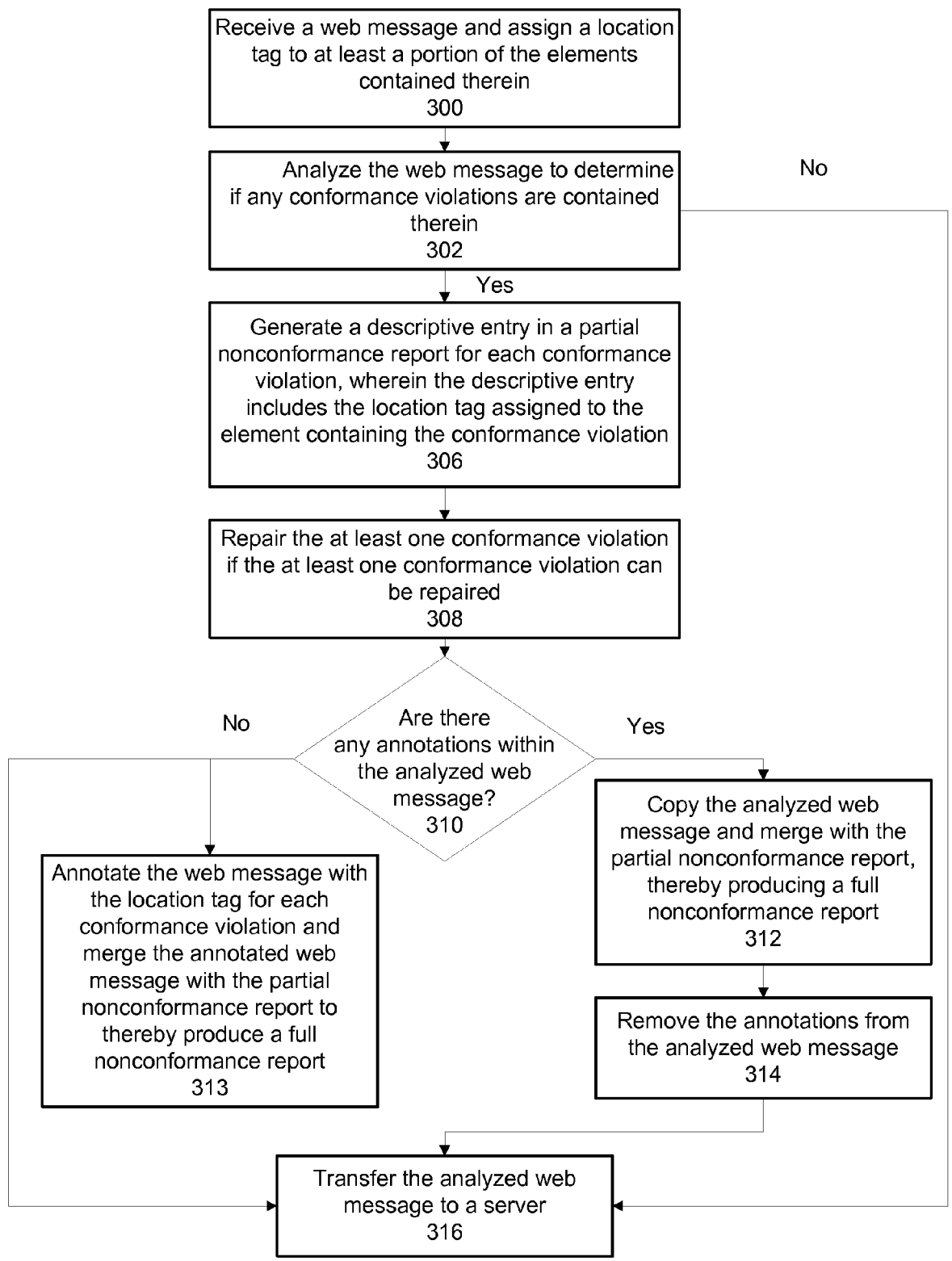
FIG. 3 illustrates an exemplary embodiment of a process for reporting conformance violations in web-services messages.

FIG. 3 illustrates another exemplary embodiment of a process for reporting conformance violations in web-services messages. A web message is received and a location tag is assigned to at least a portion of the elements contained therein (block 300). In one embodiment, a location tag is assigned to each element in the web message. The web message is analyzed to determine if any conformance violations are contained therein (block 302), as described hereinabove in FIG. 2. If no conformance violations are found, then no changes are made to the web message 102, and the analyzed web message 106 is output (e.g., to a message server) (block 316). If at least one conformance violation is found, then a descriptive entry is generated in a partial nonconformance report for each conformance violation, wherein the descriptive entry includes the location tag assigned to the element containing the conformance violation (block 306).

The at least one conformance violation is repaired if the at least one conformance violation can be repaired (block 308). The conformance violation can be repaired during the analysis blocks 302 and 306 described hereinabove, or can be performed at a separate repair stage executed after the analysis is performed (as shown in FIG. 3). In embodiments where there are multiple stages, the repair could be performed, for example, during or at the end of each stage.

The fact that repairs can be performed as a separate stage from analysis means that web site-specific repair stages can be utilized. For example, if a web site offering web-services notices that a particular client repeatedly issues requests that deviate from a required profile in a specific way, then a repair stage can be developed to repair that specific conformance violation. In an exemplary embodiment, web site-specific repair stages are supported by allowing site-specified "fix-up stylesheets" (e.g., programs written in XLST, or another suitable language) to be written and installed into the analysis tool as additional repair stages. Since the partial non-conformance report can be made available to such fix-up stylesheets, the fix-up stylesheets need not perform any analysis in the exemplary embodiment. Instead, the fix-up stylesheets may follow the references within the report to immediately locate the conformance violation that it is designed to repair.

The analysis tool can perform the repairs by reviewing the partial nonconformance report to determine if any reparable conformance violations are present within the analyzed web message. If reparable conformance violations are present, the location tags contained therein can be used for each reparable conformance violation to locate the conformance violations within the analyzed web message. The analyzed web message can then be repaired before it is output for processing.

In an exemplary embodiment, the repair can be executed by creating a modified copy of the analyzed web message, with the repaired elements substituted for the conformance violations, and installing this copy as the new active message, to be passed to the next stage. However, altering and copying the analyzed web message can cause the location tags within the partial nonconformance report to no longer accurately refer to the modified copy of the analyzed web message. To avoid this problem, the modified copy is annotated with an additional reference attribute containing the location tag used by the partial nonconformance report. In an exemplary implementation, wherein the analysis stages precede the stages in which the analyzed web message can be modified, only the elements that are actually referenced in the partial nonconformance report are annotated.

In an exemplary embodiment using XSLT, the location tags in the partial nonconformance report can use the XSLT "generate-id( )" function to generate strings with which to identify elements within the analyzed web message. The "generate-id( )" function can return a character string that is unique within a given XML tree, and returns the same string when invoked on a given element. When a stage requires that the web message be copied, then each copied element can be assigned a reference attribute whose value is given by invoking the "generate-id( )" function on the element being copied. Since the reference attribute is a normal attribute, it can be copied forward into any subsequent copies of the web message. This copy-and-annotate process may add a reference attribute only if a given element does not already have such an attribute.

The following exemplary web message, which is written in XML, illustrates an analyzed web message that has been repaired and annotated:

```
<?xml version="1.0" encoding="UTF-8"?>
  <SOAP:Envelope dpcr:reference="node2"
xmlns:ds="http://www.w3.org/2000/09/xmldsig#"
xmlns:saml="urn:oasis:names:tc:SAML:1.0:assertion"
xmlns:dpcr="http://www.datapower.com/ConformanceAnalysis
xmlns:SOAP="http://www.w3.org/2003/05/soap-envelope"
xmlns:wsse="http://docs.oasis-open.org/wss/2004/01/oasis-200401-wss-wssecurity-
secext-1.0.xsd" xmlns:wsse11="http://docs.oasis-open.org/wss/oasis-wss-wssecurity-
secext-1.1.xsd" xmlns:wsu="http://docs.oasis-open.org/wss/2004/01/oasis-200401-wss-
wssecurity-utility-1.0.xsd">
    <SOAP:Header dpcr:reference="node4" wsu:Id="MsgHeader">
      <wsse:Security dpcr:reference="node7" header="1">
       <wsse:BinarySecurityToken dpcr:reference="nodea"
EncodingType="http://docs.oasis-open.org/wss/2004/01/oasis-200401-wss-soap-
message-security-1.0#Base64Binary" ValueType="http://docs.oasis-
open.org/wss/2004/01/oasis-200401-wss-x509-token-profile-1.0#X509v3"
wsu:Id="SomeCert">
          FoooBaar
       </wsse:BinarySecurityToken>
       <wsu:Timestamp dpcr:reference="node10">
         <wsu:Created dpcr:reference="node12">1999-02-08T12:30:31Z</wsu:Created>
         <wsu:Expires dpcr:reference="node15">1999-02-08T12:30:31Z</wsu:Expires>
       </wsu:Timestamp>
       <ds:Signature dpcr:reference="node19" Id="theSig">
         <ds:SignedInfo dpcr:reference="node1c">
          <ds:CanonicalizationMethod Algorithm="http://www.w3.org/2001/10/xml-exc-
c14n#" dpcr:reference="node1e"></ds:CanonicalizationMethod>
          <ds:Reference dpcr:reference="node21" URI="">
            <ds:Transforms dpcr:reference="node24">
             <ds:Transform Algorithm="http://www.w3.org/2001/10/xml-exc-c14n#"
dpcr:reference="node26"></ds:Transform>
            </ds:Transforms>
            <ds:DigestMethod Algorithm="http://www.w3.org/2000/09/xmldsig#sha1"
dpcr:reference="node2a"></ds:DigestMethod>
            <ds:DigestValue
dpcr:reference="node2d">13qi5GjhHnfoBn/jOjQp2mq0Na4=</ds:DigestValue>
          </ds:Reference>
         </ds:SignedInfo>
         <ds:SignatureValue
dpcr:reference="node32">oxNwoqGbzqg1YBliz+PProgcjw8=</ds:SignatureValue>
         <ds:KeyInfo dpcr:reference="node35">
          <wsse:SecurityTokenReference dpcr:reference="node37">
            <wsse:Reference dpcr:reference="node39" URI="#SomeCert"
ValueType="http://docs.oasis-open.org/wss/2004/01/oasis-200401-wss-x509-token-
profile-1.0#X509v3"></wsse:Reference>
          </wsse:SecurityTokenReference>
         </ds:KeyInfo>
       </ds:Signature>
      </wsse:Security>
    </SOAP:Header>
    <SOAP:Body dpcr:reference="node42" wsu:Id="MsgBody">
      <snap dpcr:reference="node45">
```

```
        content
      </snap>
    </SOAP:Body>
</SOAP:Envelope>
```

The reference attributes included in the example above take the form of "dpcr:reference='node2'," for example, and are assigned to each element within the message.

FIG. 4 illustrates an exemplary embodiment of a partial nonconformance report for the above exemplary annotated web message. The format of this exemplary embodiment of a partial nonconformance report is an XML document containing a series of individual conformance violation entries, each of which may contain references to the place within the message where the violation was found. Line 400 includes an XML element stating that the version of XML used is 1.0 and that the encoding is UTF-8. Line 402 states that the subsequent code relates to the conformance report.

Line 404 includes information relevant to a conformance violation. Line 404 states that the report requirement violated is R3002, and the severity is "FAIL." This may mean that the message is rejected due to the severity of this non-conformance, for example. Line 404 further specifies that the specification that the analysis was performed for was BSP 1.0, and the type of analysis was conformance. Any specification and any type of analysis may be substituted for these examples, and the invention is not limited in this regard.

Line 406 includes the location tag of the specified conformance violation. Line 410 includes a description of the conformance violation. Together, lines 404, 406, and 410 make up the nonconformance entry for the specified conformance violation.

When used internally as a report passed between analysis or processing stages, the nonconformance report may be kept separate from the web message. This permits the web message to be left unmodified by most analysis stages, instead of being copied from input to output as it would have to be if contained within the nonconformance report. This can be advantageous because the copying can entail extra processing. Separating the web message and the nonconformance report also can permit repair processing to examine only the conformance violations to determine if they include problems that can be addressed, rather than requiring the repair processing to review and parse the entire web message.

In an exemplary embodiment, the reference attribute can be named within a namespace private to the analysis process. For example, in the example shown in FIG. 4, 'dpcr:reference' is used as a location tag, with the 'dpcr:' indicating the private namespace. This can be advantageous because it avoids the possibility of confusion if the web message contains an attribute named "reference."

Returning to FIG. 3, it can be desirable to remove the annotations, which can cause errors if not removed, before the annotated web message is output for processing. Therefore, in an exemplary embodiment, the annotations corresponding to location tags for the repaired conformance violations can be removed after the repair is performed (block 314) and the analyzed web message 106 can be output to the message server 108 (block 316). Also, the analyzed web message (with annotations) can be copied and the copy can be merged with the partial nonconformance report, to thereby produce a full nonconformance report (block 312)

If the analyzed web message 106 has not been modified due to repaired conformance violations, then it will not contain annotations, and block 316 can be executed. Also, the analyzed web message can be annotated with the location tag for each conformance violation to produce the annotated web message, which can then be merged with the partial nonconformance report to thereby produce a full nonconformance report (block 313).

A message may be large, and copying it can be a significant source of overhead, so minimizing the number of copies made is important for optimizing the performance of the analysis tool. The process described above can reduce the number of copies made to one in the case that no repairs are performed (i.e., a copy is made for insertion into full nonconformance report). If repairs are made in each of N repair stages, then no more than N+2 copies need be made (i.e. one copy per repair made, in addition to a copy to insert the annotated message into full nonconformance report, and a final copy-and-de-annotate to create the analyzed web message). In an exemplary embodiment, the compiler and runtime can explicitly support de-annotation of received analyzed web messages. Such an embodiment can be advantageous because a separate copy-and-de-annotate stage would not be required, and instead the removal of the 'reference' attribute to create analyzed web message could be done during serialization.

Figure 5:
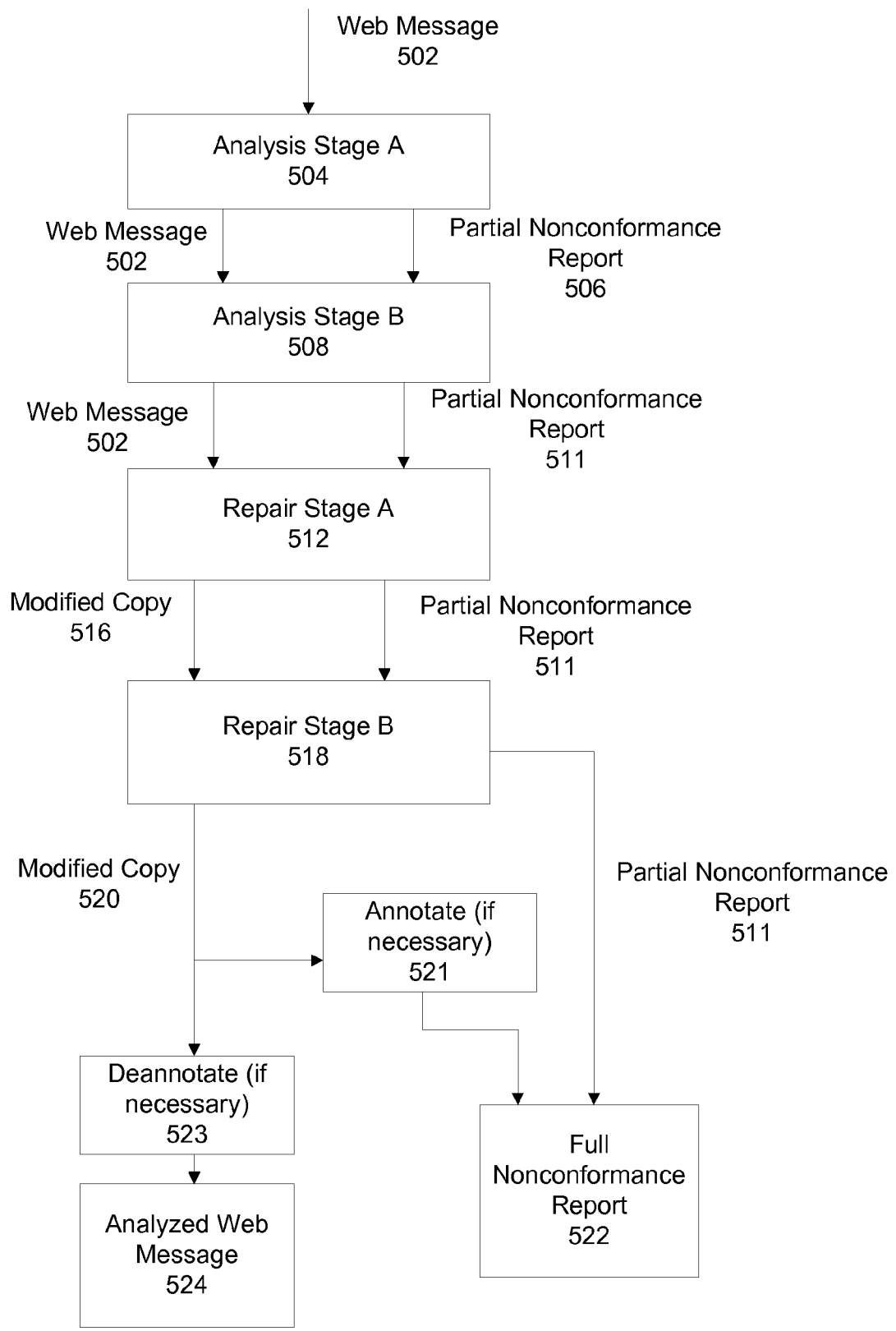
FIG. 5 illustrates an exemplary embodiment of a data flow for a system for reporting conformance violations in web-services messages.

FIG. 5 illustrates an exemplary embodiment of a data flow for reporting conformance violations in web-services messages. In an exemplary embodiment, the analysis tool 104 can implement the analysis and repair stages 504-510 using Extensible Stylesheet Language Transformations ("XSLT").

Before the first analysis stage, a web message 502 is initialized so each element within the web message 502 is assigned a unique location tag. Subsequently, access to the web message 502 is arranged such that if a given stage does not need to modify it, then it is passed on to the next stage, thereby avoiding unnecessary copying of the web message 502. The web message 502 is analyzed at analysis stage 504 to detect conformance violations for profile A. Conformance violations are appended as elements within a partial nonconformance report 506, which can contain the list of analyses performed, the location tag for the element containing the conformance violation, and a set of conformance violations identified by previous stages (if any). The web message 502 and the partial nonconformance report 506 are passed to analysis stage 508. Because the web message 502 is substantially unaltered by analysis stage 504, there is no need to copy the web message 502.

The process described above can be repeated at analysis stage 508. The web message 502 can be analyzed to detect conformance violations for a second profile, profile B. The conformance violations for profile B can be appended as elements within a partial nonconformance report 506, which can contain the list of analyses performed, the location tag for the element containing the conformance violation, and a set of conformance violations identified by previous stages (if any). Because the web message 502 is substantially unaltered by analysis stage 508, there is no need to copy the web message 502. After the analysis is completed, the web message 502 and the amended partial nonconformance report 511 can be passed to repair stage 512.

At repair stage 512, the conformance violations under profile A that can be repaired are repaired as described hereinabove, and modified copy 516 and partial nonconformance report 511 can be output. Likewise, at repair stage 518, the conformance violations under profile B that can be repaired are repaired as described hereinabove, and modified copy 520 and partial nonconformance report 511 can be output. After repair stage 518, the modified copy 520 can be merged with partial nonconformance report 511 to form full nonconformance report 522. To facilitate review of the full nonconformance report 522, it can be desirable for modified copy 516 to include annotations. However, if repair stage 512 makes no changes to the web message 502, then the web message does not include annotations. Therefore, before the full nonconformance report 522 is formed, the analysis tool checks for annotations in the web message it receives. If there are no annotations, then the analysis tool can perform the annotation process described above to create annotation at stage 521. On the other hand, if a modification has been made to the message, then the modified copy will already be annotated, and can be used within the full nonconformance report 522. In this case, however, analyzed message 524 must be generated by creating a copy of analyzed message 524 with the annotations removed (e.g., the reference attributes can be deleted at stage 523).

In an exemplary embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is mainly described in terms of particular systems provided in particular implementations. However, one of ordinary skill in the art will readily recognize that this method and system will operate effectively in other implementations. For example, the systems, devices, and networks usable with the present invention can take a number of different forms. The present invention will also be described in the context of particular methods having certain steps. However, the method and system operate effectively for other methods having different and/or additional steps not inconsistent with the present invention.

A method and system for reporting protocol violations in web-services messages has been described. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A method for reporting conformance violations in web-services messages comprising:
   receiving a web message and assigning a location tag to at least a portion of the elements contained therein;
   analyzing the web message to determine if any conformance violations are contained therein;
   generating, when the web message contains at least one conformance violation, a descriptive entry in a partial nonconformance report for each conformance violation, wherein the descriptive entry includes the location tag assigned to the element containing the conformance violation;
   annotating the web message with the location tag for each conformance violation and merging the annotated web message with the partial nonconformance report to thereby produce a full nonconformance report; and
   outputting an analyzed web message.

2. The method of claim 1 wherein the partial nonconformance report is maintained separately from the web message.

3. The method of claim 1 wherein the method is performed by a network appliance.

4. The method of claim 1 further comprising repairing the conformance violation if the conformance violation can be repaired.

5. The method of claim 1 further comprising transferring the full nonconformance report to a report server.

6. The method of claim 4 wherein the repairing the conformance violation comprises copying the web message to form a modified copy comprising a reference attribute for each element located within the web message and repairs to the web message.

7. The method of claim 6 further comprising:
   removing the reference attributes from the modified copy; and
   outputting the modified copy to a message server.

8. The method of claim 1 further comprising outputting the web message to a message server if there are no modifications made to the web message.

9. The method of claim 4 wherein the repairing the conformance violation is web-site specific.

10. An analysis tool for reporting conformance violations in web-services messages, wherein the analysis tool is configured to:

receive a web message and assign a location tag to at least a portion of the elements contained therein;

analyze the web message to determine if any conformance violations are contained therein;

generate, when the web message contains at least one conformance violation, a descriptive entry in a partial nonconformance report for each conformance violation, wherein the descriptive entry includes the location tag assigned to the element containing the conformance violation;

annotate the web message with the location tag for each conformance violation and merge the annotated web message with the partial nonconformance report to thereby produce a full nonconformance report; and output an analyzed web message.

11. The analysis tool of claim 10 wherein the analysis tool is further configured to maintain the partial nonconformance report separately from the web message.

12. The analysis tool of claim 10 wherein the analysis tool comprises a network appliance.

13. The analysis tool of claim 10 wherein the analysis tool is further configured to repair the conformance violation if the conformance violation can be repaired.

14. The analysis tool of claim 10 wherein the analysis tool is further configured to transfer the full nonconformance report to a report server.

15. The analysis tool of claim 12 wherein the repairing the conformance violation comprises copying the web message to form a modified copy comprising a reference attribute for each element located within the web message and repairs to the web message.

16. The analysis tool of claim 14 wherein the analysis tool is further configured to:

remove the reference attributes from the modified copy; and output the modified copy to a message server.

17. The analysis tool of claim 10 wherein the analysis tool is further configured to output the web message to a message server if there are no modifications made to the web message.

18. An executable software product stored on a computer-readable medium containing program instruction executable by a processor for reporting conformance violations in web-services messages, the program instructions for:

receiving a web message and assigning a location tag to at least a portion of the elements contained therein;

analyzing the web message to determine if any conformance violations are contained therein;

generating, when the web message contains at least one conformance violation, a descriptive entry in a partial nonconformance report for each conformance violation, wherein the descriptive entry includes the location tag assigned to the element containing the conformance violation;

annotating the web message with the location tag for each conformance violation and merging the annotated web message with the partial nonconformance report to thereby produce a full nonconformance report; and outputting an analyzed web message.

19. The executable software product of claim 18 wherein the nonconformance report is maintained separately from the web message.

20. The executable software product of claim 18 wherein the program instructions are performed by a network appliance.

21. The executable software product of claim 18 further comprising program instructions for repairing the conformance violation if the conformance violation can be repaired.

22. The executable software product of claim 18 further comprising program instructions for transferring the full nonconformance report to a report server.

23. The executable software product of claim 19 wherein the repairing the conformance violation comprises copying the web message to form a modified copy comprising a reference attribute for each element located within the web message and repairs to the web message.

24. The executable software product of claim 22 further comprising program instructions for:

removing the reference attributes from the modified copy; and outputting the modified copy to a message server.

25. The executable software product of claim 18 further comprising program instructions for outputting the web message to a message server if there are no modifications made to the web message.

* * * * *